United States Patent [19]

Maejima

[11] Patent Number: 4,832,623

[45] Date of Patent: May 23, 1989

[54] SYNTHETIC RESIN ELECTRICAL CONNECTOR

[75] Inventor: Toshiro Maejima, Shizuoka, Japan

[73] Assignee: Yazaki Corporation, Tokyo, Japan

[21] Appl. No.: 126,386

[22] Filed: Nov. 30, 1987

[51] Int. Cl.[4] .......................................... H01R 33/08
[52] U.S. Cl. .................................................... 439/660
[58] Field of Search ................ 439/660, 682, 685, 686

[56] References Cited

FOREIGN PATENT DOCUMENTS 0806323 2/1969 Canada ................................ 439/660

Primary Examiner—Steven Mottola
Attorney, Agent, or Firm—Sughrue, Mion, Zinn, Macpeak and Seas

[57] ABSTRACT

An electrical connector having a reduced amount of bending of engaging walls thereof during molding. The connector has engaging walls formed of a synthetic resin by molding and which are generally rectangular in section. Portions of the engaging walls other than side and front edge portions are expanded outwardly. This has the effects of both reducing the amount of bening which can occur during molding and accommodating any residual bending which may occur.

3 Claims, 2 Drawing Sheets

SYNTHETIC RESIN ELECTRICAL CONNECTOR

BACKGROUND OF THE INVENTION

The present invention relates to a electrical connector. More specifically, the invention relates to an electrical connector formed of a synthetic resin and having a rectangular cross section.

Recently, the numbers of electrodes or contacts carried by electrical connectors used in electrical appliances and the like have tended to increase due to the increasing complexity of the appliances. To install such a connector having an increased number of contacts, a like number of leads must be installed, making the total time to install the connector rather lengthy.

A conventional connector of the same general type to which the invention relates may include a plurality of small connectors fitted into a single engaging frame. A mating connector is provided at the other end.

For example, as shown in FIGS. 1A and 1B, an engaging frame A' and A" of the connector has an engaging wall 1 having a generally rectangular cross section. The engaging frame is molded from a synthetic resin. However, the engaging wall 1 has a tendency to bend and deform, due to various factors, during the molding process. To prevent the engaging wall 1 from bending during molding, as shown in FIG. 1A, horizontally extending ribs a are formed on the outer surfaces of the engaging wall 1, or, as shown in FIG. 1B, vertically extending ribs b can be provided on the outer surface of the engaging wall 1.

When the size of the connector is increased though, and consequently the length of the engaging wall 1 is increased, the bending-preventing effect of the ribs a or b is decreased, as a result of which, as shown in FIGS. 2A and 2B, the engaging wall 1 has a marked tendency to bow slightly inwardly, as indicated at c and d, respectively. This may distort the shape of the connector to such an extent that it becomes difficult to fit it together with the mating connector.

SUMMARY OF THE INVENTION

Accordingly, it is an object of the present invention to provide a connector in which bending of the engaging walls of the connector during molding is significantly reduced and in which, even if some bending unavoidably occurs, it can still be successfully fitted together with its mating connector.

In accordance with the above and other objects, the invention provides a connector having a generally rectangular engaging well formed from a synthetic resin by molding. Portions of the engaging wall other than front and side edges are expanded outwardly, and tapered portions are formed between the expanded and nonexpanded portions. As a result, bending during molding of the engaging wall is remarkably reduced, and any residual bending can be accommodated by the expanded portions. Thus, the mating connector can be smoothly inserted through the rear opening of the connector.

DESCRIPTION OF THE PREFERRED EMBODIMENTS

Preferred embodiments of the invention will now be described with reference to the attached drawings.

Figure 3:
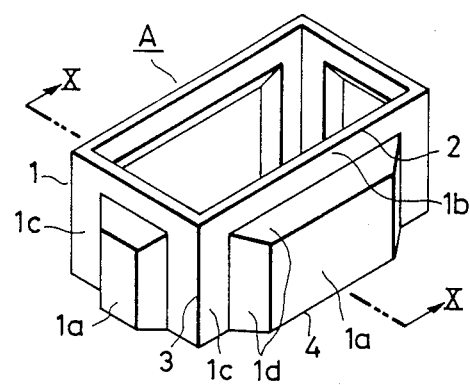
FIG. 3 is a perspective view showing an engaging frame of a connector constructed according to the present invention.
Figure 4:
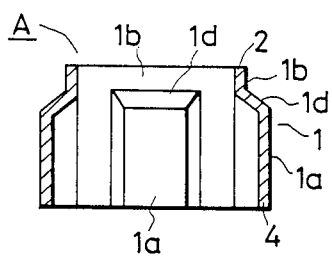
FIG. 4 is a cross-sectional view taken along a line X—X in FIG. 3.
Figure 5:
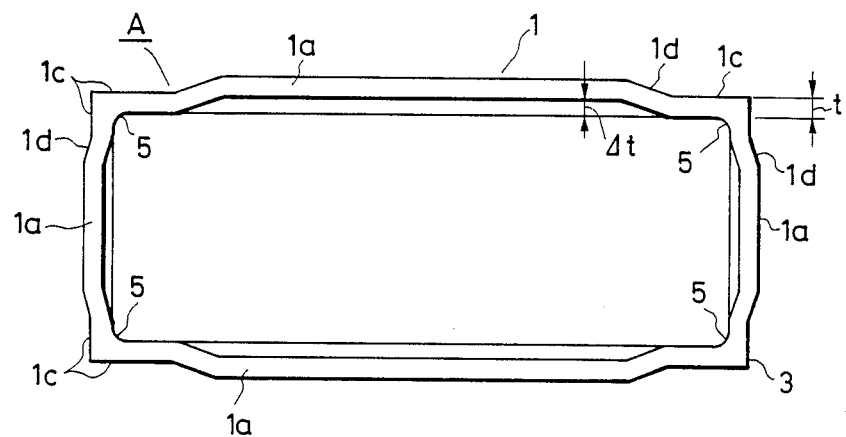
FIG. 5 is a bottom view of the engaging frame shown in FIGS. 3 and 4.

FIG. 3 is a perspective view showing an engaging frame A constructed in accordance with the teachings of the present invention, FIG. 4 is a cross-sectional view taken along a line X—X in FIG. 3, and FIG. 5 is a bottom view of the engaging frame described above in conjunction with FIGS. 3 and 4.

The engaging frame A of the inventive connector has engaging walls 1 formed of a synthetic resin, each of which is generally rectangular. Each engaging wall 1 includes planar portions 1b, inclusive of a front edge 2, and 1c, inclusive of side edges 3. An outwardly expanded portion 1a is formed in the central area of the engaging frame A. The outwardly expanded portion 1a includes a portion of the rear edge 4.

Figure 2A:
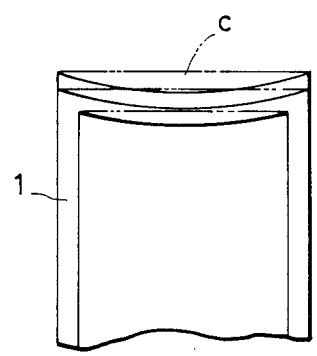
FIGS. 2A and 2B are partially cut-away plan views showing bending of the engaging frames of the conventional connectors of FIGS. 1A and 1B.
Figure 2B:
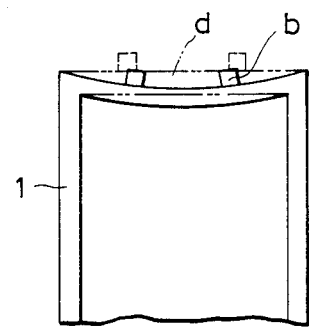

Each of the expanded portions 1a is predominantly flat and merges with the planar portions 1b and 1c through tapered portions 1d, thus forming a step. The distance t between the expanded portion 1a and the nonexpanded, planar portions 1b and 1c should be determined so as to accommodate any bending that may occur during the formation of the engaging wall 1 (FIGS. 2A and 2B). In practice, it is preferable that the distance t satisfy:

$$(1/3)T \leqq t \leqq (2/5)T$$

where T is the thickness of the engaging wall 1.

In addition, it is preferable for the four corners 5 of the engaging wall 1 to be rounded.

In the engaging frame for a connector of the present invention, due to the provision of the expanded portion 1a having the tapered portions 1d, bending of the engaging walls 1 of the frame during the molding process is remarkably reduced. Thus, the engaging frame of the connector of the invention has a greatly improved dimensional stability, particularly with respect to the inner dimensions of the engaging frame.

Figure 1A:
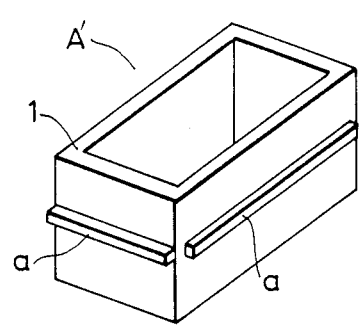
FIGS. 1A and 1B are perspective views showing examples of the engaging frame of a conventional connector.
Figure 1B:
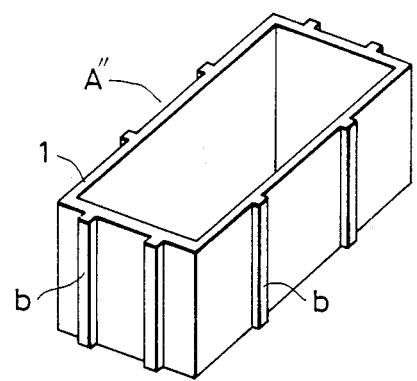

It is believed that the reason why bending of the planar portions 1b and 1c is suppressed to such a remarkable extent is that the tapered portions 1d act similarly to the ribs used on the conventional frame A' or A" (FIGS. 1A and 1B), and that the four arcuate corners of the engaging frame A absorb part of the stress occurring during molding which would otherwise result in bending. The inner corners 5 of the engaging frame A are rounded as shown in FIG. 5.

Figure 6:
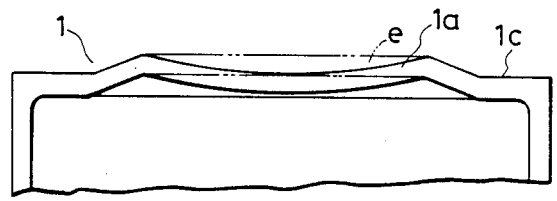
FIG. 6 is an explanatory diagram used for describing the effect of the engaging frame of the invention.

Even if the expanded portion 1a is bent as indicated a e in FIG. 6, the bending e can be accommodated within the distance t of expansion of the expanded portion 1a. Hence, there is effectively no reduction in the tolerances of the inner dimensions of the frame. Accordingly, when the connector is fitted to a mating connector (not shown) by inserting the mating connector inside the engaging wall 1 through the end opening defined by the latter at the rear edge 4, any residual bending in the engaging wall 1 will not obstruct the smooth mating of the two connectors. The mating connector will of course be held tightly by the nonexpanded portions 1b and 1c.

The invention as described above is of course applicable to connectors of many different sizes, numbers of contacts, and arrangements of contacts.

In the inventive connector described above having a generally rectangular engaging wall formed from a synthetic resin by molding, portions of the engaging wall other than front and side edges are expanded outwardly, and tapered portions are formed between the expanded and nonexpanded portions. As a result, bending during molding of the engaging wall is remarkably reduced, and any residual bending can be accommodated by the expanded portions. Thus, the mating connector can be smoothly inserted through the rear opening of the connector. Tight engagement of the mating connector is achieved through the nonexpanded portions.

What is claimed is:

1. In an electrical connector defining an inward cavity having an engaging frame having at least one substantially rectangular engaging wall formed of a synthetic resin by molding, the improvement wherein said engaging wall is expanded outwardly from said cavity except in front and side edge portions thereof.

2. The electrical connector of claim 1, wherein a distance t between expanded and nonexpanded portions of said engaging wall is within a range of:

$$(\tfrac{1}{3})T \leq t \leq (2/5)T$$

where T is a thickness of said engaging wall.

3. The electrical connector of claim 2, wherein inner corners of said engaging frame are rounded.

* * * * *